US008258462B2

(12) United States Patent
Remes et al.

(10) Patent No.: US 8,258,462 B2
(45) **Date of Patent: *Sep. 4, 2012**

(54) METHODS OF CALIBRATING AND OPERATING AN ION TRAP MASS ANALYZER TO OPTIMIZE MASS SPECTRAL PEAK CHARACTERISTICS

(75) Inventors: Philip M. Remes, Berkeley, CA (US); Jae C. Schwartz, Gilroy, CA (US)

(73) Assignee: Thermo Finnigan LLC, San Jose, CA (US)

(*) Notice: Subject to any disclaimer, the term of this patent is extended or adjusted under 35 U.S.C. 154(b) by 163 days.

This patent is subject to a terminal disclaimer.

(21) Appl. No.: 12/890,980

(22) Filed: Sep. 27, 2010

(65) Prior Publication Data

US 2011/0012013 A1 Jan. 20, 2011

Related U.S. Application Data

(63) Continuation-in-part of application No. 12/205,624, filed on Sep. 5, 2008, now Pat. No. 7,804,065.

(51) Int. Cl.

| | |
|---|---|
| ***H01J 49/42*** | (2006.01) |
| ***H01J 49/00*** | (2006.01) |
| ***B01D 59/44*** | (2006.01) |

(52) U.S. Cl. ........................ 250/252.1; 250/282; 702/27

(58) Field of Classification Search .......... 250/281–283, 250/287, 288, 290–293, 397; 702/19, 23, 702/27; 435/5

See application file for complete search history.

(56) References Cited

U.S. PATENT DOCUMENTS

| | | | | |
|---|---|---|---|---|
| 4,540,884 | A | 9/1985 | Stafford et al. | |
| 4,686,367 | A | 8/1987 | Louris et al. | |
| 5,285,063 | A | 2/1994 | Schwartz et al. | |
| 5,298,746 | A | 3/1994 | Franzen et al. | |
| 5,347,127 | A | 9/1994 | Franzen | |
| 5,397,894 | A | 3/1995 | Wells et al. | |
| 5,448,061 | A * | 9/1995 | Wells | 250/282 |
| 5,479,012 | A * | 12/1995 | Wells | 250/282 |
| 5,572,025 | A | 11/1996 | Cotter et al. | |
| 6,124,591 | A | 9/2000 | Schwartz et al. | |
| 6,831,275 | B2 | 12/2004 | Franzen et al. | |
| 7,804,065 | B2 * | 9/2010 | Remes et al. | 250/292 |

FOREIGN PATENT DOCUMENTS

EP 0 747 929 A1 12/1996

OTHER PUBLICATIONS

Schwartz et al., "A Two-Dimensional Quadrupole Ion Trap Mass Spectrometer", American Society for Mass Spectrometry 2002, 13, pp. 659-669.

* cited by examiner

*Primary Examiner* — Bernard E Souw
(74) *Attorney, Agent, or Firm* — Charles B. Katz

(57) ABSTRACT

A method for calibrating an ion trap mass spectrometer is disclosed. The method includes establishing an optimal phase and amplitude-m/z relationship by acquiring peak quality data at varying values of amplitude and phase. The resonant ejection voltage applied to the electrodes of the ion trap may then be controlled during analytical scans in accordance with the established relationship between m/z and resonant ejection voltage amplitude.

16 Claims, 7 Drawing Sheets

METHODS OF CALIBRATING AND OPERATING AN ION TRAP MASS ANALYZER TO OPTIMIZE MASS SPECTRAL PEAK CHARACTERISTICS

CROSS-REFERENCE TO RELATED APPLICATION

The present application is a continuation-in-part and claims the priority benefit under 35 U.S.C. §120 of U.S. patent application Ser. No. 12/205,624 by Remes et al., filed Sep. 5, 2008 now U.S. Pat. No. 7,804,065, the contents of which are incorporated herein by reference.

FIELD OF THE INVENTION

The present invention relates generally to ion trap mass spectrometers, and more particularly to methods for operating an ion trap mass spectrometer to optimize ejection peak characteristics.

BACKGROUND OF THE INVENTION

Ion trap mass analyzers have been described extensively in the literature (see, e.g., March et al., "Quadrupole Ion Trap Mass Spectrometry", John Wiley & Sons (2005)) and are widely used for mass spectrometric analysis of a variety of substances, including small molecules such as pharmaceutical agents and their metabolites, as well as large biomolecules such as peptides and proteins. Mass analysis is commonly performed in ion traps by the resonant excitation method, wherein a resonant ejection voltage is applied across a pair of electrodes while the amplitude of the main radio-frequency (RF) trapping voltage is ramped, causing ions to come into resonance and be ejected from the ion trap to the detector(s) in order of their mass-to-charge ratios (m/z's).

It is known that the characteristics of a mass spectral peak, e.g., peak height, width, and isotope spacing/ratio, acquired by resonant ejection will vary with the amplitude of the resonant ejection voltage, and that the amplitude that optimizes certain peak characteristics depends on the m/z of the ejected ion. The prior art contains a number of references that describe methods for varying the resonant ejection voltage amplitude during an analytical scan in order to produce high quality mass spectral peaks across the measured range of m/z's. For example, U.S. Pat. No. 5,298,746 to Franzen et al. ("Method and Device for Control of the Excitation Voltage for Ion Ejection from Ion trap Mass Spectrometers") prescribes controlling the resonant ejection voltage during the analytical scan such that its amplitude is set proportionally to the square root of the main RF trapping voltage amplitude. In another example, U.S. Pat. No. 5,572,025 to Cotter et al. ("Method and Apparatus for Scanning an Ion Trap Mass Spectrometer in the Resonance Ejection Mode") discloses operating an ion trap to maintain a constant ratio between the RF trapping voltage and resonant ejection voltage amplitudes. It is also known in the art to utilize empirical calibrations using mass spectra acquired for calibrant ions of known m/z to attempt to optimize selection of the resonant ejection voltage amplitude for desirable peak characteristics, such as width.

It has been observed, however, that a simple relation between m/z and resonant ejection voltage amplitude may not provide optimized performance when an ion trap is operated under certain conditions, such as when the resonant ejection voltage and main RF trapping voltage are maintained in a phase-locked state, and/or when low ion trap pressures are utilized. Experimental studies of ion traps operated under such conditions indicate that as the resonant ejection voltage amplitude is varied, several regions of acceptable peak characteristics are seen, separated by transition regions having poor peak characteristics. Against this background, there is a need for a method for calibrating and operating an ion trap mass spectrometer operated under conditions which produce behavior more complex than is addressed by prior art methods.

SUMMARY OF THE INVENTION

Roughly described, a method for calibrating an ion trap mass spectrometer in accordance with an illustrative embodiment of the present invention includes steps of selecting a phase of the resonant ejection voltage that optimizes a peak quality representative of one or more mass spectral peak characteristics; identifying, for each of a plurality of calibrant ions having different m/z's, a resonant ejection voltage amplitude that optimizes the peak quality when the ion trap is operated at the selected phase; and, deriving a relationship between m/z and resonant ejection voltage amplitude based on the optimized resonant ejection voltage amplitude identified for the plurality of calibrant ions. Data representing the m/z-resonant ejection voltage amplitude relationship thus derived may be stored and subsequently utilized to control the resonant ejection voltage amplitude during analytical scanning of the ion trap, such that at any time during the scan the resonant ejection voltage amplitude is set to optimize the peak quality of the ion being ejected.

According to a more specific implementation of the calibration method, the m/z-resonant ejection voltage amplitude relationship that optimizes peak quality is derived for each of a plurality of available analytical scan rates. At each scan rate, a phase that produces optimal peak quality is selected by monitoring the variation in peak quality with phase and identifying the phase at which the peak quality value is optimized. The peak quality is calculated from one or more peak characteristics, which may include any one or all of peak width, height, valley, isotope spacing and isotope ratio. The peak quality calculation may be identical or different for each scan rate. The resonant ejection voltage amplitude that optimizes peak quality is then determined, for each of the calibrant ions, by monitoring the variation in peak quality with resonant ejection voltage amplitude while the phase is maintained at the experimentally optimized value. An m/z-resonant ejection voltage amplitude calibration that optimizes peak quality may then be derived, for example, by fitting a line, piecewise linear segments, or a curve to the several (m/z, optimized resonant ejection voltage amplitude) points representing the calibrant ions.

DETAILED DESCRIPTION OF EMBODIMENTS

Figure 1:
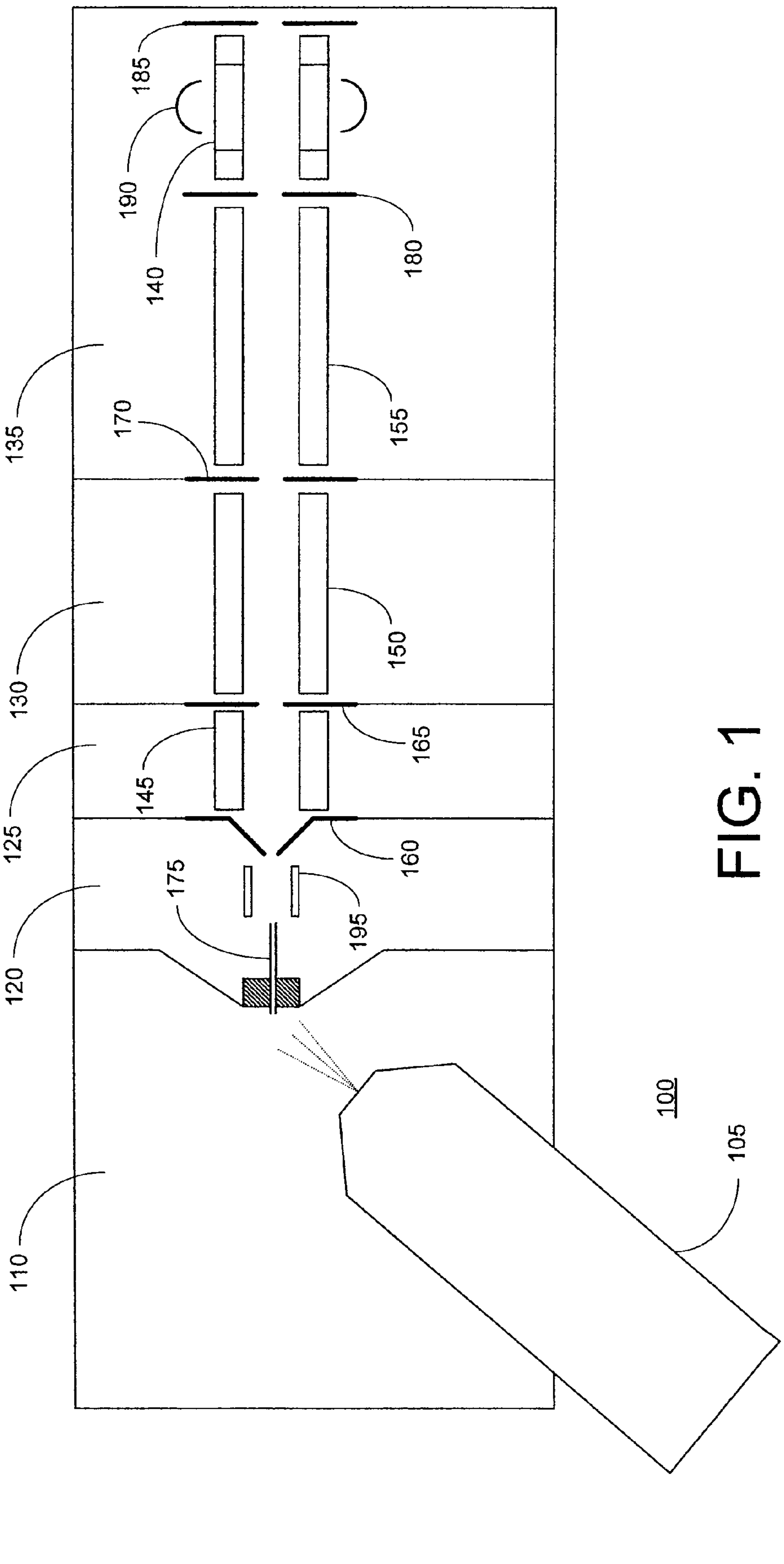
FIG. 1 is symbolic view of an ion trap mass spectrometer which may be calibrated and operated in accordance with methods embodying the present invention.

FIG. 1 illustrates an example of an ion trap mass spectrometer 100 which may be calibrated and operated in accordance with embodiments of the present invention. It will be understood that certain features and configurations of mass spectrometer 100 are presented by way of illustrative examples, and should not be construed as limiting the methods of the present invention to implementation in a specific environment. An ion source, which may take the form of an electrospray ion source 105, generates ions from a sample material. For the calibration methods described herein, the sample material will include one or more calibration mixes that yield calibrant ions of known m/z. Preferably, the calibration mix is selected to produce a set of calibrant ions having m/z's that span a substantial portion of the measurable range. For example, a standard calibration mix may yield ions having m/z's of 195 (caffeine), 524 (MRFA), 1222, 1522 and 1822 (Ultramark). The calibration mix may be introduced via infusion from a syringe, a chromatography column, or injection loop.

The ions are transported from ion source chamber 110, which for an electrospray source will typically be held at or near atmospheric pressure, through several intermediate chambers 120, 125 and 130 of successively lower pressure, to a vacuum chamber 135 in which ion trap 140 resides. Efficient transport of ions from ion source 105 to ion trap 140 is facilitated by a number of ion optic components, including quadrupole RF ion guides 145 and 150, octopole RF ion guide 155, skimmer 160, and electrostatic lenses 165 and 170. Ions may be transported between ion source chamber 110 and first intermediate chamber 120 through an ion transfer tube 175 that is heated to evaporate residual solvent and break up solvent-analyte clusters. Intermediate chambers 120, 125 and 130 and vacuum chamber 135 are evacuated by a suitable arrangement of pumps to maintain the pressures therein at the desired values. In one example, intermediate chamber 120 communicates with a port of a mechanical pump (not depicted), and intermediate pressure chambers 125 and 130 and vacuum chamber 135 communicate with corresponding ports of a multistage, multiport turbo-molecular pump (also not depicted). Ion trap 140 includes axial trapping electrodes 180 and 185 (which may take the form of conventional plate lenses) positioned axially outward from the ion trap electrodes to assist in the generation of a potential well for axial confinement of ions, and also to effect controlled gating of ions into the interior volume of ion trap 140. A damping/collision gas inlet (not depicted), coupled to a source of an inert gas such as helium or argon, will typically be provided to controllably add a damping/collision gas to the interior of ion trap 140 in order to facilitate ion trapping, fragmentation and cooling. Ion trap 140 is additionally provided with at least one set of detectors 190 (wherein each set may consist of a single detector or multiple detectors) that generate a signal representative of the abundance of ions ejected from the ion trap.

Ion trap 140, as well as other components of mass spectrometer 100, communicate with and operate under the control of a data and control system (not depicted), which will typically include a combination of one or more general purpose computers and application-specific circuitry and processors. Generally described, the data and control system acquires and processes data and directs the functioning of the various components of mass spectrometer 100. The data and control system will have the capability of executing a set of instructions, typically encoded as software or firmware, for carrying out the calibration methods described herein.

Figure 2:
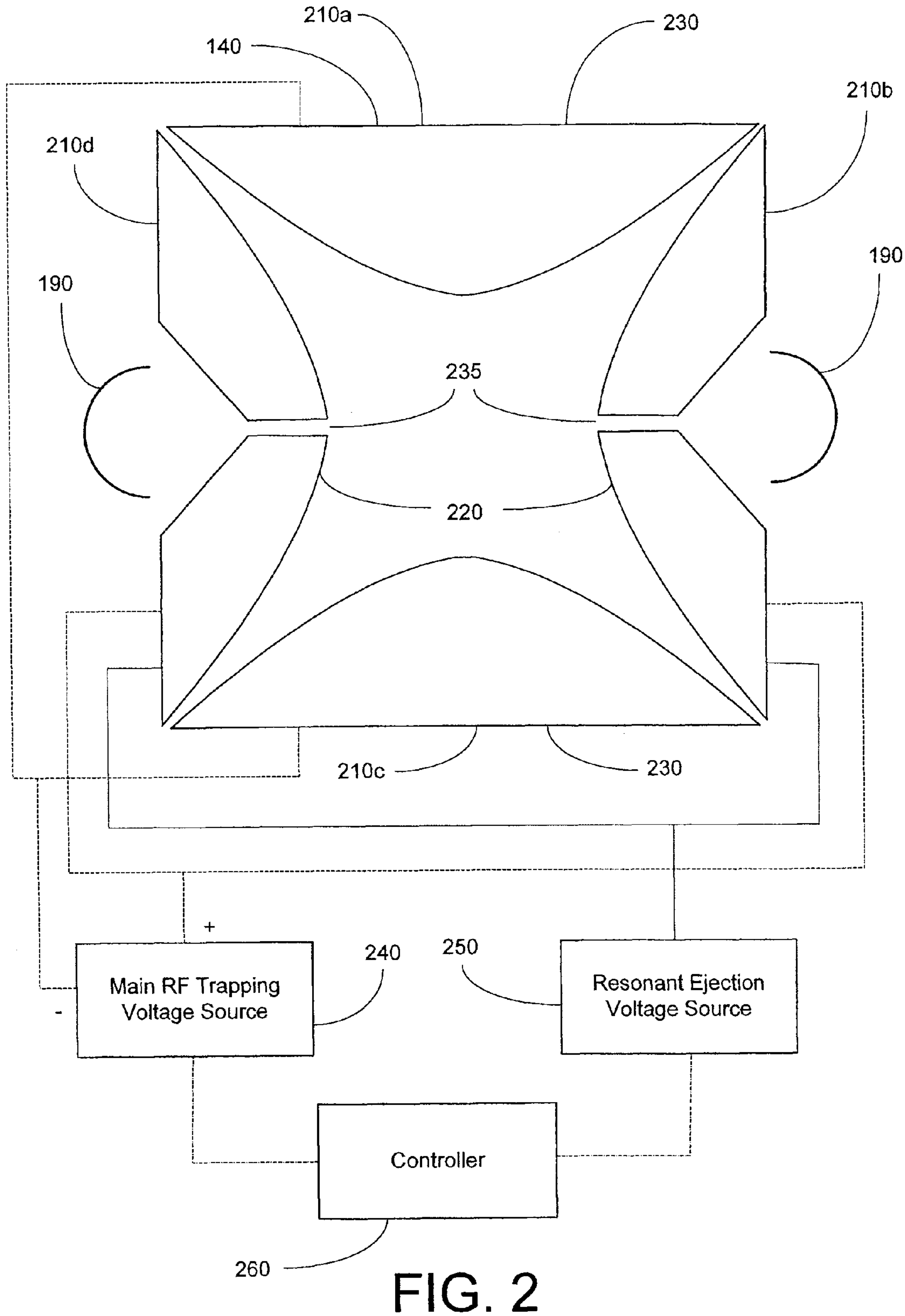
FIG. 2 is a symbolic lateral cross-sectional view of a two-dimensional radial ejection ion trap mass analyzer.

FIG. 2 depicts a symbolic cross-sectional view of ion trap 140, which may be constructed as a conventional two-dimensional ion trap of the type described by Schwartz et al. in "A Two-Dimensional Quadrupole Ion Trap Mass Spectrometer", J. Am. Soc. Mass Spectrometry, 13: 659-669 (2002). Ion trap 140 includes four elongated electrodes 210*a,b,c,d*, each electrode having an inwardly directed hyperbolic-shaped surface, arranged in two electrode pairs 220 and 230 aligned with and opposed across the trap centerline. The electrodes of one electrode pair 220 are each adapted with an aperture (slot) 235 extending through the thickness of the electrode in order to permit ejected ions to travel through the aperture to an adjacently located detector 190. A main RF trapping voltage source 240 applies opposite phases of an RF voltage to electrode pairs 220 and 230 to establish an RF trapping field that radially confines ions within the interior of ion trap 140. During analytical scans, resonant ejection voltage source 250 applies an oscillatory voltage across apertured electrode pair 220 to create a dipole excitation field. The amplitude of the applied main trapping RF voltage is ramped such that ions come into resonance with the excitation field in order of their m/z's. The resonantly excited ions develop unstable trajectories and are ejected through apertures 235 to detectors 190. Control of the main RF trapping voltage and resonant ejection voltage applied to electrodes of ion trap 140, specifically adjustment of their amplitudes and relative phase, is effected by a controller 260 that forms part of the data and control system. As will be discussed further below, controller 260 may also be operable to adjust the analytical scan rate, either automatically or in accordance with operator input.

Figure 3:
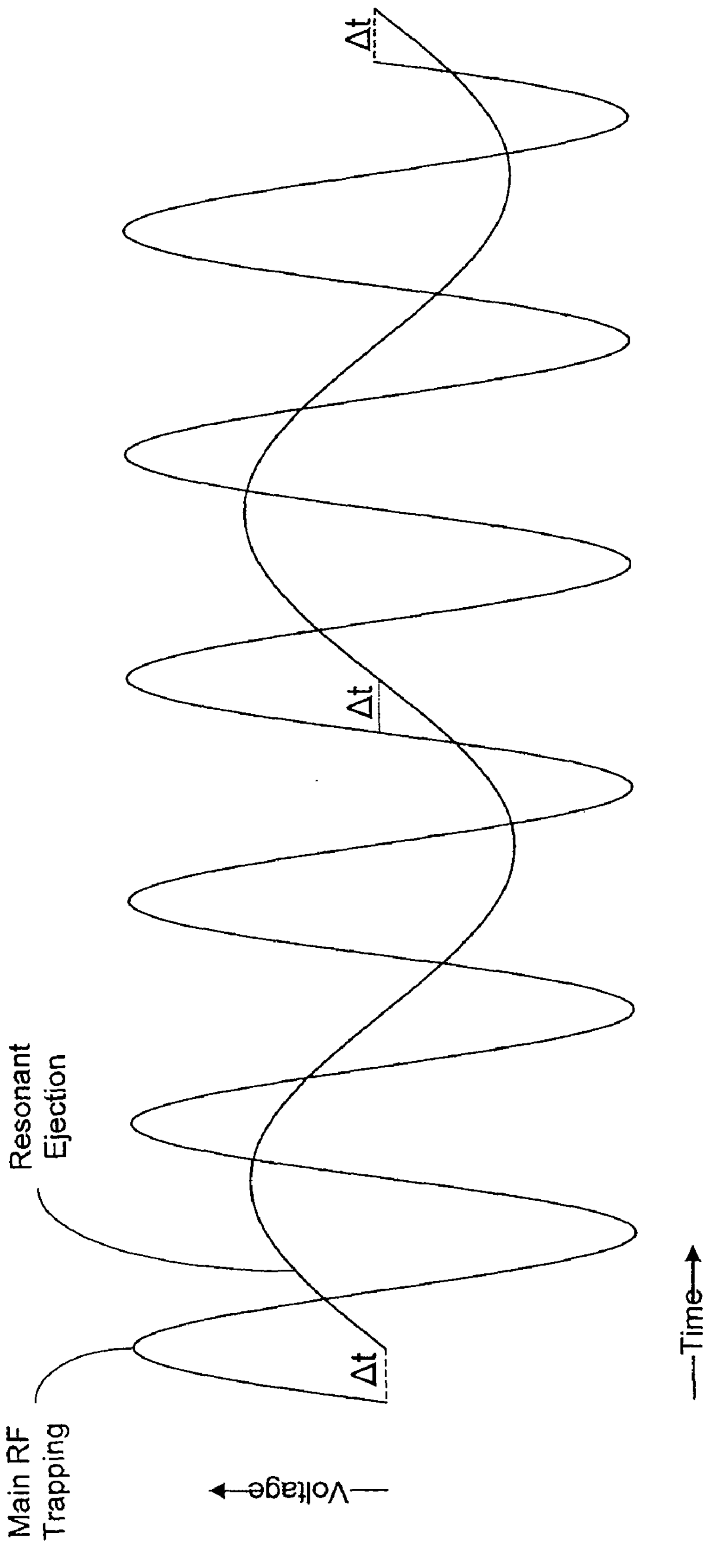
FIG. 3 is a graph depicting the phase relationship between the RF trapping and resonant excitation voltages.

While FIG. 2 depicts a conventionally arranged and configured two-dimensional ion trap, practice of the invention should not be construed as being limited to any particular ion trap geometry or configuration. In an alternative implementation, the ion trap may take the form of a symmetrically stretched, four-slotted ion trap of the type described in the U.S. patent application by Jae C. Schwartz filed on even date herewith and entitled "Two-Dimensional Radial-Ejection Ion Trap Operable as a Quadrupole Mass Filter", the disclosure of which is herein incorporated by reference. The ion trap may also constitute a part of a dual ion trap mass analyzer structure disclosed in U.S. Patent Application Pub. No. 2008-0142705A1 for "Differential-Pressure Dual Ion Trap Mass Analyzer and Methods of Use Thereof" by Jae C. Schwartz et al, which is also incorporated herein by reference. The methods described herein may also be utilized in connection with conventional rotationally symmetric three-dimensional ion traps (including variants such as toroidal or cylindrical ion traps) as well as for rectilinear ion traps FIG. 3 is a graph illustrating the relationship between the main RF trapping voltage and resonant ejection voltage applied to electrodes of ion trap. Although each voltage is depicted as having a sinusoidal form, other types of oscillatory waveforms (e.g., square or triangular) may be utilized. The resonant ejection voltage may have a frequency that is an integer fraction (for example and without limitation, ⅓, as depicted in FIG. 3) of the frequency of the main RF trapping voltage waveform. This condition allows the phases of the resonant ejection voltage and main RF trapping voltage to maintained in a fixed relationship, i.e., a cycle of the resonant ejection voltage always begins at a constant delay time $\Delta t$ after a corresponding cycle of the main RF trapping voltage. The delay time may be adjusted by appropriate control of main RF trapping voltage source 240 and resonant ejection voltage source 250, and suitable phase locking techniques known in the art may be employed to prevent or minimize drifting of the phase relationship during an analytical scan. For the purpose of the present application, the phase relationship between main RF trapping and resonant excitation voltages is denoted by the resonant ejection voltage phase parameter $\theta_{reseject}$, which is calculated (in units of degrees) according to the equation:

$$\theta_{reseject}=(\Delta t/P)*360$$

where P is equal to the period of the resonant ejection voltage.

Figure 4:
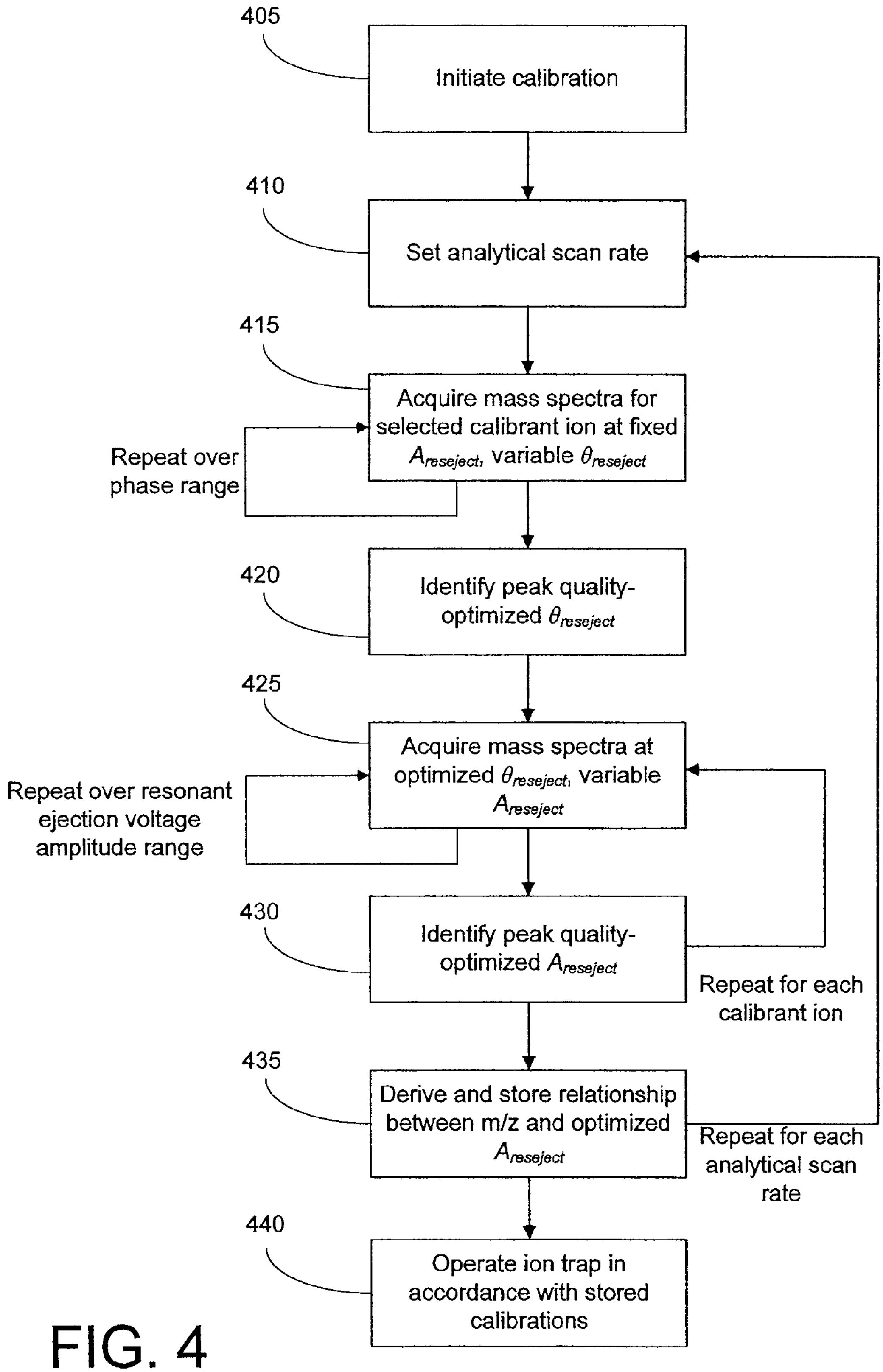
FIG. 4 is a flowchart depicting steps of a method for calibrating the resonant ejection voltage amplitude in accordance with an embodiment of the present invention.

FIG. 4 is a flowchart depicting the steps of a method for calibrating and operating an ion trap mass spectrometer, in accordance with an illustrative embodiment of the present invention. Initiation of the calibration procedure in step 405 may occur automatically at prescribed intervals (e.g., once per month) or on the occurrence of certain events (e.g., power-up or replacement of an instrument component), or may be manually prompted by the instrument operator.

In step 410, an analytical scan rate is set to one of the values available on the instrument. Many commercial ion trap mass spectrometers provide the operator with the ability to specify an analytical scan rate (typically expressed in units of Dalton/sec) based on performance requirements, notably throughput and resolution. For example, the Finnigan LTQ® ion trap mass spectrometer (Thermo Fisher Scientific, San Jose, Calif.) offers five analytical scan rates, referred to as turbo, normal, enhanced, zoom, and ultra-zoom. In some mass spectrometers, switching between analytical scan speeds may be performed automatically in a data-dependent manner. Since the analytical scan rate affects the ejection peak characteristics, it is beneficial to calibrate the ion trap at each of the available scan rates in order to obtain maximum performance and more reliable and accurate calibrations.

Next, in step 415, a plurality of analytical scans of ions produced from a calibration standard are performed at different values of $\theta_{reseject}$ that span a range of interest, while holding the resonant ejection voltage amplitude ($A_{reseject}$) fixed. The phase range of interest may include all possible values of $\theta_{reseject}$ (e.g., 0-120 degrees for the example depicted in FIG. 3 and $\theta_{reseject}$ equation given above); alternatively, the range of interest may encompass a narrower set of values identified prior to initiating step 415, as is described herein below in connection with FIGS. 8 and 9. $\theta_{reseject}$ may be varied in discrete steps of, for example, 0.5-2.0 degrees. Each of the resultant mass spectra is analyzed to determine a peak quality of the ejection peak of a selected calibrant ion. For the purpose of this step 415, a calibrant ion having an m/z lying in the middle portion of the measured m/z range may be selected, e.g., the m/z 1222 Ultramark ion. As used herein, peak quality is a value calculated from one or more peak characteristics such as peak height, width, valley, peak symmetry, isotope spacing and mass position and is representative of the ability of the peak to provide meaningful and accurate qualitative and/or quantitative information regarding the associated ion. The peak quality may be calculated from a set of equations stored in the memory of the control and data system. The peak quality may be calculated in a different fashion for each scan rate since the expected optimized performance characteristics will be different for each scan rate. According to an illustrative implementation, during step 415 the peak quality may be calculated as follows:

For high scan rate:

$$\text{Peak Quality}=N(I(^{12}C))-N(\text{Width}(^{12}C))$$

For medium scan rate:

$$\text{Peak Quality}=N(I(^{12}C))-N(\text{Width}(^{12}C)+\text{Width}(^{13}C)+4*\text{valley}(^{12}C)+2*\text{isoShift}(^{12}C))$$

For low scan rate:

$$\text{Peak Quality}=N(I(^{12}C))-N(\text{Width}(^{12}C)+2*\text{isoShift}(^{12}C))$$

where N denotes a normalized value, Width is the full-width half-maximum (FWHM) peak width, I is the peak intensity, $^{12}C$ and $^{13}C$ respectively denote the mass spectral peaks arising from the $^{12}C$ and $^{13}C$ isotopes of the calibrant ion, and the isoshift and valley parameters are calculated as follows:

$$\text{isoShift}=|(M(^{12}C)_{observed}+1)-M(^{13}C)_{observed})|$$

where $M(^{12}C)_{observed}$ and $M(^{13}C)_{observed}$ are, respectively, the measured masses of the $^{12}C$ and $^{13}C$ isotopes of the calibrant ion; and $$\text{Valley}=I(^{12}C+0.5)_{observed}/I(^{13}C)_{observed}$$

where $I(^{12}C+0.5)_{observed}$ is the measured intensity at an m/z value equal to 0.5 plus the m/z of the $^{12}C$ isotope of the calibrant ion.

Those skilled in the art will recognize that the foregoing equations will yield a relatively high value for "good" peaks and a relatively low value for "bad" peaks.

In other implementations, the equations used to calculate peak quality may be selected or adjusted in accordance with operator input. Such input may include information identifying or weighing the importance of certain peak characteristics.

Figure 5:
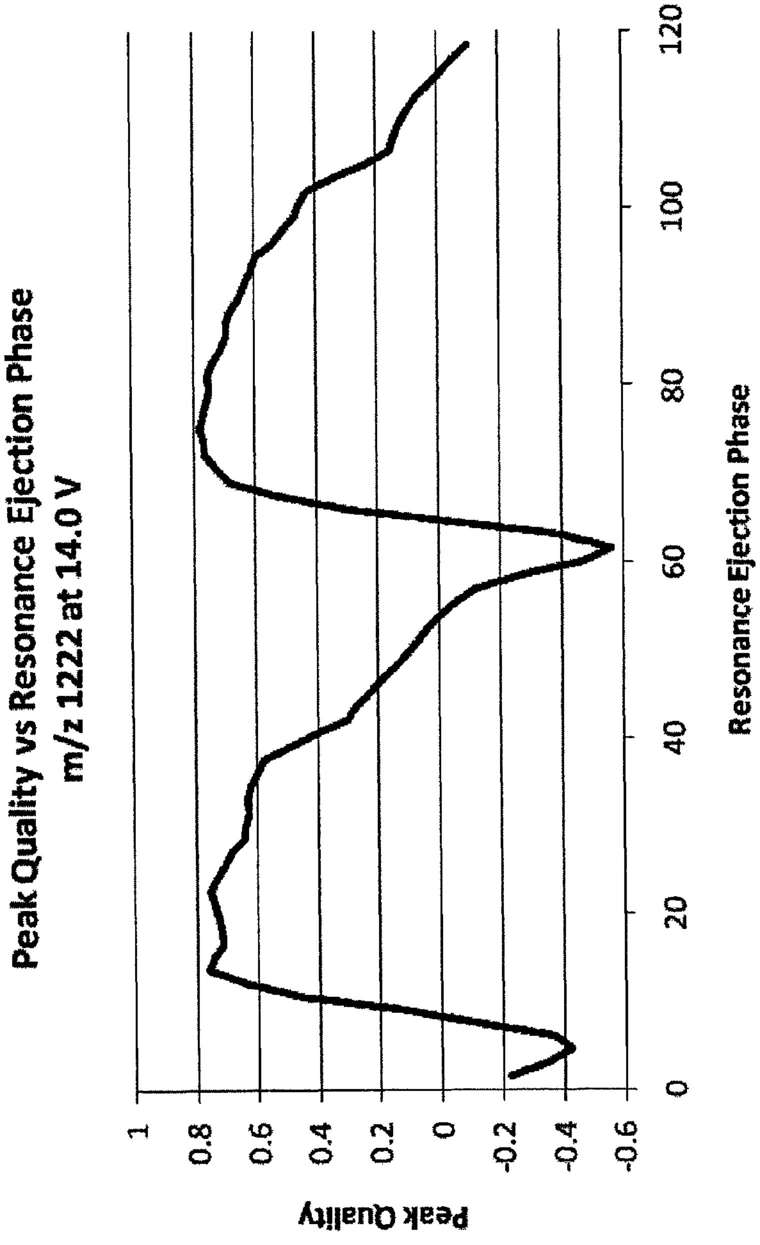
FIG. 5 is a graph showing the variation of mass spectral peak quality with resonant ejection voltage phase for a calibrant ion.

Once peak quality has been calculated for mass spectra acquired at each value of $\theta_{reseject}$, the data are analyzed to identify the value of $\theta_{reseject}$ that produces optimal peak quality, step 420. This value is stored in the data and control system for subsequent use. FIG. 5 is a graph illustrating an example of the variation of peak quality with $\theta_{reseject}$ for a calibrant ion (the m/z 1222 Ultramark ion). It may be discerned that the peak quality exhibits a relatively large value (indicating a "good" mass spectral peak) at a $\theta_{reseject}$ of approximately 20 degrees, which may be selected as the optimal value. Selection of the optimal value of $\theta_{reseject}$ may simply involve locating a maximum in the peak quality vs. $\theta_{reseject}$ curve. In other implementations, particularly where the variation of peak quality with $\theta_{reseject}$ exhibits complex behavior, the selection of the optimal value of $\theta_{reseject}$ may involve one or more steps of processing the data using known averaging or filtering operations, and/or involve choosing local optima in regions of more uniform behavior.

In the foregoing example, the global optimum resonant ejection voltage phase is identified by acquiring peak quality data for a selected calibrant ion at a fixed value of amplitude while $\theta_{reseject}$ is varied. Alternative implementations of the phase optimization step may utilize a procedure wherein peak quality measurements are obtained for different values of $\theta_{reseject}$ over a range of resonant ejection voltage amplitudes. Such implementations may employ any one or combination of suitable two-dimensional optimization techniques known in the art (including, without limitation, mapping, simplex, particle swarm and the like) to identify the optimal phase from the acquired peak quality data.

In step 425, a plurality of analytical scans of ions produced from a calibration standard are performed at different values of the resonant ejection voltage amplitude ($A_{reseject}$) that span a range of interest, while holding $\theta_{reseject}$ at the optimal value derived in the previous step. As is discussed further below, this step is performed for each of n calibrant ions, for example the five calibrant ions mentioned above (m/z 195, 524, 1222, 1522 and 1822). The range of values over which $A_{reseject}$ is varied may be automatically determined based on, among other factors, the analytical scan rate selected in step 410 and the m/z of the calibrant ion, and the increment by which $A_{reseject}$ is stepped over. The range of values may also depend on the analytical scan rate and calibrant ion m/z. In one specific implementation, $A_{reseject}$ is varied from about 3-12 $V_{p-p}$ for the m/z 195 calibrant ion, and from about 10-45 $V_{p-p}$ for the m/z 1522 calibrant ion.

Each of the mass spectra acquired in step 425 is analyzed to determine a peak quality of the ejection peak of a selected calibrant ion. Peak quality may be calculated using the same equations utilized to calculate peak quality in step 415, or a different set of equations may be employed. As discussed above, the peak quality may be calculated in a different fashion for each analytical scan rate.

Figure 6A:
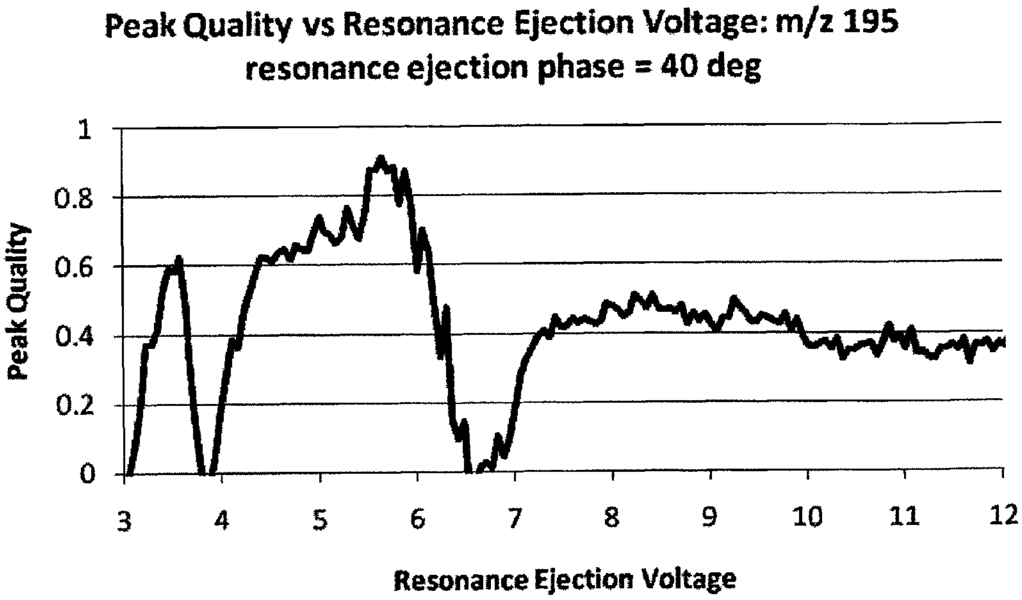
FIGS. 6A and 6B are graphs showing the variation of mass spectral peak quality with resonant ejection voltage amplitude for two calibrant ions.
Figure 6B:
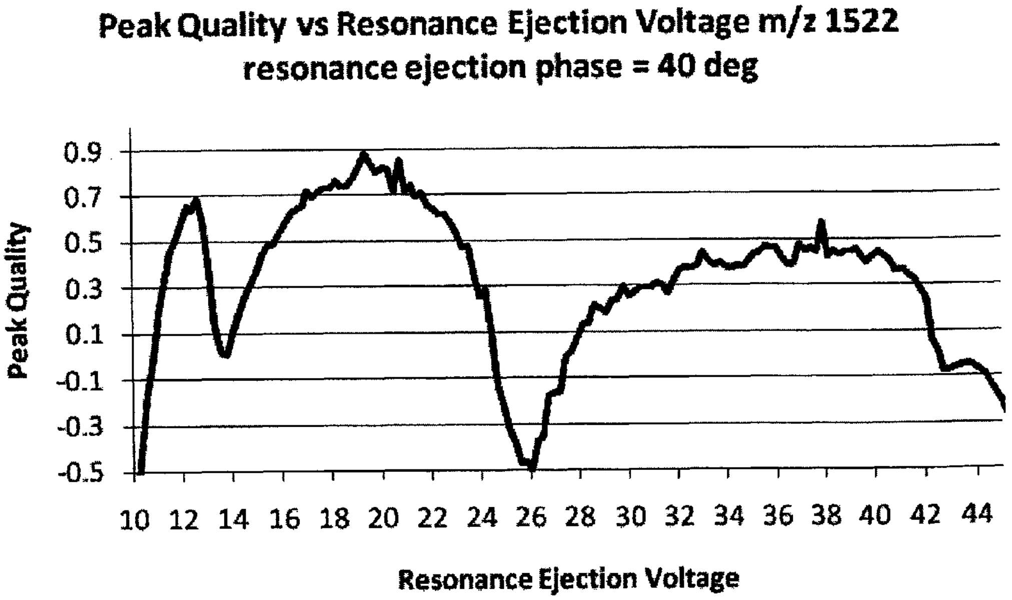

Following the calculation of peak quality for mass spectra acquired at each value of $\theta_{reseject}$, the data are analyzed to identify the value of $A_{reseject}$ that produces optimal peak quality, step 430. In a manner analogous to step 415, identification of the peak-quality optimized value of $A_{reseject}$ may be performed simply by locating a maximum in the peak quality vs. $A_{reseject}$ curve, or may instead involve a more complex analysis utilizing, for example, averaging and/or filtering steps. FIGS. 6A and 6B illustrate examples of the variation of peak quality with $A_{reseject}$ for the m/z 195 and 1522 calibrant ions, respectively. For the m/z 195 calibrant ion, it is seen that the peak quality has a maximum value (indicative of a "good" peak) at $A_{reseject}$ of about 5.8 $V_{p-p}$ and a minimum value (indicative of a "bad" peak) at $A_{reseject}$ of about 3.8 $V_{p-p}$. Thus, the optimal $A_{reseject}$ corresponding to m/z 195 may be set to 5.8 $V_{p-p}$ for the selected analytical scan rate. Similarly, it is seen that the peak quality exhibits a maximum value for the m/z 1522 calibrant ion at $A_{reseject}$ of about 20 $V_{p-p}$ (to which the optimal value may be set) and a minimum value at $A_{reseject}$=22.1$V_{p-p}$.

Figure 7:
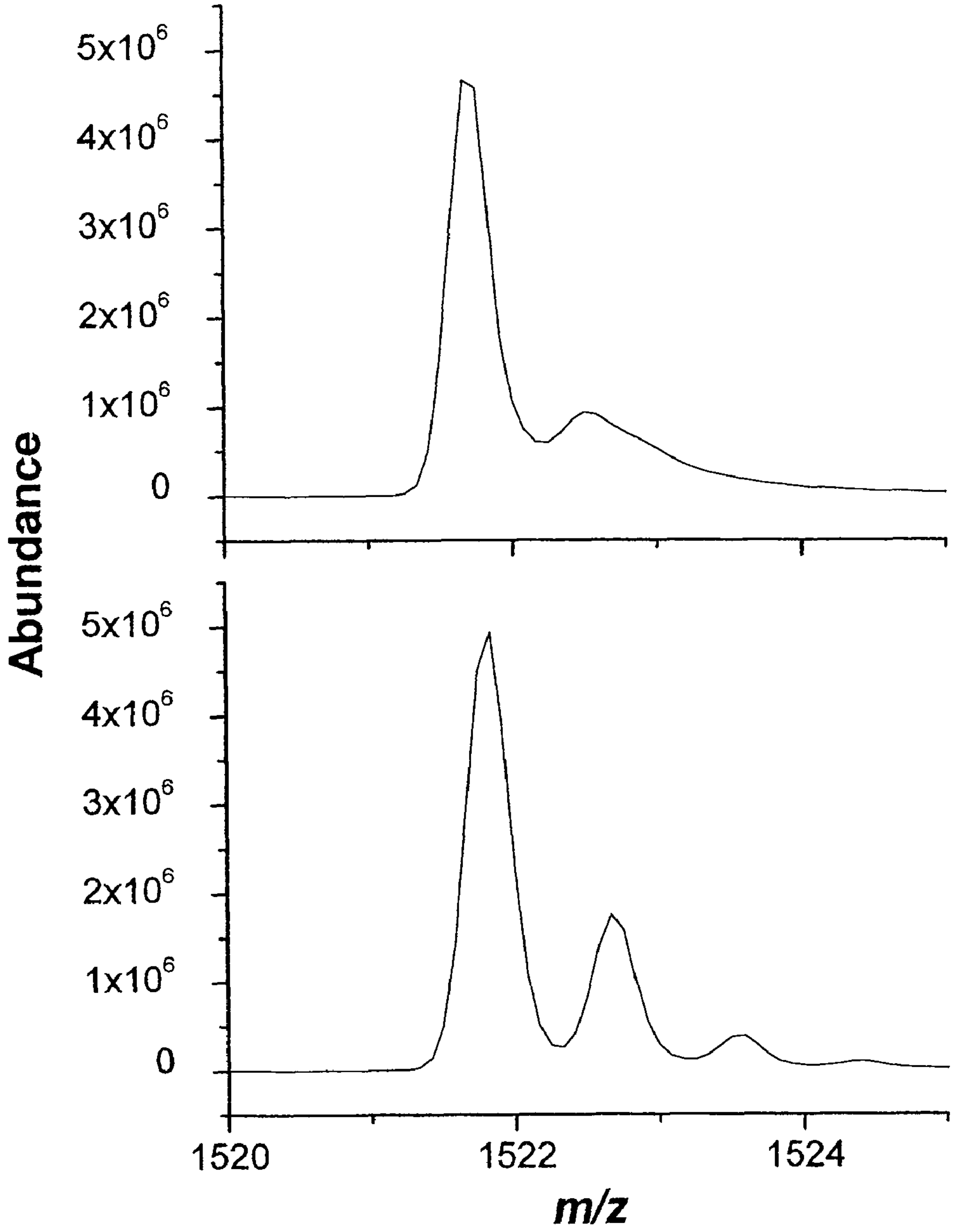
FIG. 7 shows a comparison of mass spectral peaks for a calibrant ion acquired at different values of resonant ejection voltage amplitude.

FIG. 7 depict examples of "good" (displayed on the bottom) and "bad" (displayed on the top) mass spectral peaks acquired for the m/z 195 calibrant ion at different values of $A_{reseject}$. It may be easily discerned that the isotopic components of the "good" peak are more symmetrical and better resolved relative to those of the "bad" peak.

Steps 425 and 430 are repeated for each of the n calibrant ions to identify the value $A_{reseject}$ that produces optimal peak characteristics for each calibrant ion. This yields a set of n experimentally determined (m/z, $A_{reseject}$) points. The calibration relationship between m/z and $A_{reseject}$ may then be derived by fitting a line, piecewise linear, or curve to the n experimentally determined points using well-known statistical methods (e.g., a least-squares fit), step 435. In a simple implementation, the calibration relationship will take the form of a line; in other implementations, the calibrated relationship may be a polynomial or cubic-spline curve or piecewise linear relationship. Data representing the derived calibration relationship (e.g., a slope and intercept for a linear relationship or a set of coefficients for a polynomial relationship) are stored in the memory of the data and control system of mass spectrometer 100 for use in operating ion trap 140, in the manner described below.

As indicated on FIG. 4, steps 410, 415, 420, 425, 430 and 435 are repeated for each of the available analytical scan rates (e.g., the turbo, normal, enhanced, zoom and ultra-zoom scan rates available on the Finnigan LTQ instrument mentioned above) so that calibration relationships may be derived and stored for each scan rate. Subsequent to calibration of the resonant ejection voltage amplitude, a calibration of the RF trapping voltage amplitude may be done using the same and/or different calibrant ions to optimize accuracy of measured m/z values obtained by an analytical scan. The RF trapping voltage amplitude calibration may be conducted by identifying, for each calibrant ion, the amplitude of the RF voltage that places the measured m/z at the known actual value, and then fitting a line, polynomial curve, or piece-wise linear function to the experimentally determined (m/z, RF trapping voltage) points.

The foregoing example assumes that the ion trap is configured to operate at a selected one of several discrete scan rate values, and m/z-amplitude calibration curves are derived at each of the available scan rate values. Certain mass spectrometers may allow the ion trap scan rate to be set (either under manual or automatic control) at any value within a continuous range. To accommodate such continuously variable operation, peak quality data may be acquired at a series of specified values of scan rate, and calibrated relationships (for example, in the form of a linear or polynomial function) may be derived between scan rate and optimal resonant ejection voltage phase, and between scan rate and optimal resonant ejection voltage amplitude. These calibrated relationships may be stored and subsequently invoked to determine optimal values of the phase and amplitude parameters corresponding to the scan rate at which the ion trap is operated.

After all calibration steps have been completed, ion trap 140 may then be operated for analysis of sample substances using the experimentally-derived calibration information, step 440. More specifically, analytical scans are performed (via appropriate control of main RF trapping voltage source 240 and resonant ejection voltage source 250) at the optimized value of $\theta_{reseject}$ for the scan rate being utilized, and the $A_{reseject}$ is varied during the analytical scan in accordance with the stored calibration relationship. To effect proper control of $A_{reseject}$ during the scan, a set of look-up tables may be generated and stored in memory, each table containing a list of (time, $A_{reseject}$) values calculated using the known correspondence between time and m/z at a specified analytical scan rate. Of course, other suitable techniques may be employed to control $A_{reseject}$ during analytical scans in conformance with the derived calibration relationships.

In an alternative implementation of the calibration method depicted in FIG. 4 and described above, the range of values over which $\theta_{reseject}$ is varied in step 415 is first narrowed down (relative to the range of all possible values) by performing a set of analytical scans to identify a phase region of interest where the variation of measured m/z with $\theta_{reseject}$ exhibits a desired behavior. For example, a phase region may be selected where measured m/z is relatively invariant with respect to changes in $\theta_{reseject}$. Identification of the phase region of interest may be determined by conducting a plurality of analytical scans of a selected calibrant ion at a fixed value of $A_{reseject}$ while varying $\theta_{reseject}$ over the range of possible values (e.g., 0-120 degrees). A relatively large $\theta_{reseject}$ step size (e.g., 5 degrees) may be employed to reduce the overall calibration time. The resultant mass spectra are then analyzed to identify the region exhibiting the desired behavior. This range could then be used as the range of interest for identifying the optimal $\theta_{reseject}$ in step 415, whereby $\theta_{reseject}$ is varied over this range, in relatively small increments, to determine the value of $\theta_{reseject}$ that optimizes peak quality.

The calibration methods described herein are also applicable to ion traps in which resonant excitation is achieved by the application of two or more resonant ejection voltages of differing frequencies. As used herein, the term "resonant ejection voltage" is intended to denote any oscillatory voltage (exclusive of the main RF trapping voltage) applied to the ion trap electrodes for the purpose of resonantly exciting and ejecting ions. In instances where a combination of a plurality of resonant ejection voltages of differing frequencies are utilized for excitation, the optimal phase and m/z-amplitude relationship may be separately determined for each of the component voltages and stored, such that, during operation of the ion trap for analysis of samples of unknown composition, each of the resonant ejection voltages may be set to optimized values of phase and amplitude.

In a further variation of the above-described method, optimum calibration relationships between the resonant ejection voltage amplitude, resonance ejection phase, and m/z may be determined by first acquiring peak quality data while holding the phase at a fixed default value, and varying the resonant ejection amplitude for a particular m/z. This value can be then used to scale a default resonant ejection amplitude relationship with m/z. Subsequently, the optimum phase for each m/z may be identified by varying the phase while holding the amplitude at a fixed value determined by the rescaled default relationship between resonance ejection amplitude and m/z.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of calibrating an ion trap mass analyzer having a plurality of electrodes to which a main RF trapping voltage and a resonant ejection voltage are applied, the main RF trapping voltage and resonant ejection voltage defining a resonant ejection voltage phase, the method comprising steps of:

measuring peak qualities at a plurality of different values of resonant ejection voltage amplitude for each of a plurality of calibrant ions having different mass-to-charge ratios and measuring peak qualities at a plurality of values of resonant ejection voltage phase for at least one of the calibrant ions;

identifying an optimal resonant ejection voltage phase and deriving a relationship between mass-to-charge ratio and optimal resonant ejection voltage amplitude from the peak quality data acquired in the measuring step; and storing the optimal resonant ejection phase and data representing the derived relationship.

2. The method of claim 1, wherein the measuring step includes measuring, for at least one of the calibrant ions, peak qualities acquired over a range of values of resonant ejection voltage phase and at different values of the resonant ejection voltage amplitude, and wherein the identification of the optimal resonant ejection voltage phase is based on analysis of peak quality data acquired at different phases and amplitudes of the resonant ejection voltage.

3. The method of claim 1, further comprising repeating the measuring, identifying and storing steps for each of a plurality of analytical scan rates.

4. The method of claim 1, wherein the peak quality value is calculated from a set of parameters including a parameter representative of at least one of peak width, peak height, and peak valley.

5. The method of claim 4, wherein the set of parameters further includes parameters representative at least one of isotope ratio, isotope spacing, and peak symmetry.

6. The method of claim 4, wherein an equation employed for calculating the peak quality value is adjusted in accordance with user input.

7. The method of claim 1, wherein the ion trap mass analyzer is a two-dimensional ion trap mass analyzer.

8. The method of claim 3, further comprising a step of deriving a relationship between analytical scan rate and at least one of the optimal phase and amplitude of the resonant ejection voltage.

9. The method of claim 1, wherein the resonant ejection voltage includes first and second resonant ejection voltages of different frequencies, and further wherein the optimal phases and optimal amplitude-m/z relationships are separately determined for each of the first and second resonant ejection voltages.

10. The method of claim 1, wherein the measuring step includes measuring peak qualities at a plurality of different values of resonant ejection voltage amplitude for each of the plurality of calibrant ions at the identified optimal resonant ejection voltage phase.

11. A method of operating an ion trap mass spectrometer having a plurality of electrodes to which an RF trapping voltage and a resonant ejection voltage are applied, the RF trapping voltage and resonant ejection voltage defining a resonant ejection voltage phase, the method comprising steps of:

measuring peak qualities at a plurality of different values of resonant ejection voltage amplitude for each of a plurality of calibrant ions having different mass-to-charge ratios and measuring peak qualities at a plurality of values of resonant ejection voltage phase for at least one of the calibrant ions;

identifying an optimal resonant ejection voltage phase and deriving a relationship between mass-to-charge ratio and optimal resonant ejection voltage amplitude from the peak quality data acquired in the measuring step; and storing the optimal resonant ejection phase and data representing the derived relationship; and performing an analytical scan at an analytical scan rate to acquire a mass spectrum of a sample ion population by setting the resonant ejection voltage phase to the optimal value and scanning the RF trapping voltage amplitude while varying the resonant ejection voltage amplitude in accordance with the derived relationship.

12. The method of claim 11, further comprising repeating the measuring, identifying and storing steps for each of a plurality of analytical scan rates to derive a relationship between analytical scan rate and at least one of the optimal phase and amplitude of the resonant ejection voltage, and wherein the performing step includes adjusting at least one of the resonant ejection phase and amplitude in accordance with the analytical scan rate at which the analytical scan is performed.

13. An ion trap mass spectrometer, comprising:

a plurality of electrodes defining an interior volume for receiving and trapping ions;

a main RF trapping voltage source for applying an RF trapping voltage to at least a portion of the plurality of electrodes;

a resonant ejection voltage source for applying a resonant ejection voltage to at least a portion of the plurality of electrodes, the RF trapping voltage and the resonant ejection voltage defining a resonant ejection voltage phase; and a controller, coupled to the RF trapping voltage and the resonant ejection voltage source, configured to perform steps of:

measuring peak qualities at a plurality of different values of resonant ejection voltage amplitude for each of a plurality of calibrant ions having different mass-to-charge ratios and measuring peak qualities at a plurality of values of resonant ejection voltage phase for at least one of the calibrant ions;

identifying an optimal resonant ejection voltage phase and deriving a relationship between mass-to-charge ratio and optimal resonant ejection voltage amplitude from the peak quality data acquired in the measuring step; and storing the optimal resonant ejection phase and data representing the derived relationship.

14. The mass spectrometer of claim 13, wherein the electrodes comprise elongated rod electrodes defining a two-dimensional ion trap structure.

15. The mass spectrometer of claim 13, wherein the electrodes define a rotationally symmetric three-dimensional ion trap structure.

16. The method of claim 1, wherein the ion trap mass analyzer is a three-dimensional ion trap mass analyzer.

* * * * *